Patented Jan. 15, 1952

2,582,695

UNITED STATES PATENT OFFICE 2,582,695

METHOD OF PRESERVING RUBBER AND PRODUCT THEREOF

Marion W. Harman, Nitro, W. Va., assignor to Monsanto Chemical Company, St. Louis, Mo., a corporation of Delaware No Drawing. Application January 17, 1949, Serial No. 71,399

18 Claims. (Cl. 260—803)

This invention relates to the treatment of rubber and more particularly to the use in rubber and rubber-like materials of improved antioxidant compositions.

It has long been known that deterioration due to heat, light, oxygen, and flexing in natural and synthetic rubber stocks can be materially reduced by incorporating in the rubber stock, either before or after vulcanization, the condensation product of an aliphatic ketone and an aromatic amine. The condensation products of aniline and acetone, of o- and p-amino biphenyl and acetone, of diphenyl amine and acetone, and of phenyl naphthylamine and acetone, are among the more widely known rubber antioxidants and while these and other more expensive ketone-amine condensation products produce good results, the industry has constantly sought improvements.

The chief objects of this invention are to provide the art with a new and improved antioxidant composition; to provide the art with a new composition possessing superior antiflex - cracking properties; to provide the art with a readily dispersible, economical, and efficient rubber antioxidant composition; to make more efficient use of aliphatic ketone-aromatic amine condensation products. Further objects will be apparent from the following description.

It has been found in accordance with this invention that a synergistic effect is obtained by employing an aliphatic ketone-aromatic amine condensation product in conjunction with a product obtained by reacting a hydroxy aromatic hydrocarbon with an N-(2-thiazyl thio methyl) urea of the general formula

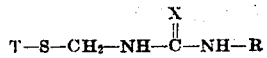

where T is a thiazyl radical, where X is a sulfur or oxygen atom, and where R is hydrogen, an alkyl, aryl, aralkyl, methylol (—CH2OH), or a methyl thio thiazyl (—CH2—S—T, where T is a thiazyl radical) radical. In other words, the resultant antioxidant composition is more active than either component and beyond the mere additive effect of the proportions of the individual components.

As exemplary of the invention the following specific embodiments are illustrative and are not to be construed as limitative thereof.

EXAMPLE 1

To a 3-neck flask equipped with a stirrer, a thermometer, and an air cooled reflux condenser were charged 209 parts by weight (substantially 0.5 mol) of bis N,N'-(2-benzothiazyl thio methyl) urea and 188 parts by weight (substantially 2.0 mols) of phenol. The reaction flask was then placed in an oil bath and heated for 80 minutes at a temperature of 175°–180° C. Vacuum was applied to the reaction mix and approximately 102 parts by weight (substantially 1.1 mols) of phenol was recovered. Approximately 284 parts by weight of a brown sticky resinous product was obtained. This resinous substance was soluble in dilute caustic, benzene, acetone, and in alcohol and believed to consist principally of a product containing approximately 1.7 mols of phenol per mol of bis N,N'-(2-benzo thiazyl thio methyl) urea.

EXAMPLE 2

To a suitable reaction vessel equipped with an air condenser, a thermometer, and stirrer were charged 104.5 parts by weight (substantially 0.25 mol) of bis N,N'-(2-benzothiazyl thio methyl) urea and 110 parts by weight (substantially 1.0 mol) of hydroquinone. The reaction vessel was then placed in an oil bath and heated for 3 hours at 175°–180° C. Upon cooling 201.7 parts by weight of a gummy mass was obtained. This product was taken up with alcohol and filtered. Upon addition of water to the filtrate a black tarry resin settled out. The resin was then dried by heating in an oil bath at 150° C. at reduced pressure. 116.7 parts by weight of a brittle black resinous material was obtained which was soluble in caustic soda, alcohol, acetone, and ethyl acetate.

EXAMPLE 3

To a suitable reaction vessel equipped with an air condenser, a thermometer, and stirrer were charged 104.5 parts by weight (substantially 0.25 mol) of bis N,N'-(2-benzothiazyl thio methyl) urea and 110 parts by weight (substantially 1.0 mol) of resorcinol. The mix was heated for 3 hours at 175°–180° C. and 204 parts by weight of a black resinous material was obtained. This resinous material was extracted with caustic, washed with water, and filtered. The filtrate was acidified with dilute sulfuric acid and a brick red gummy substance developed which gradually turned into a brittle resin. Upon removal of residual acid the product, 139.3 parts by weight of a brick-red resin, was found to have a melting point range of 155°–165° C. The product was soluble in dilute caustic, acetone, and alcohol.

The above prepared resinous materials were mechanically mixed with the p-amino biphenyl-acetone condensation product described by J. R. Ingram, U. S. Patent 2,062,885, and the mixture incorporated in the usual manner in a typical stock suitable for the tread portion of an automobile tire comprising

|  | A | B | C | D | E |
|---|---|---|---|---|---|
|  | Parts by weight | Parts by weight | Parts by weight | Parts by weight | Parts by weight |
| Smoked sheets rubber | 100 | 100 | 100 | 100 | 100 |
| Carbon black | 50 | 50 | 50 | 50 | 50 |
| Zinc oxide | 5 | 5 | 5 | 5 | 5 |
| Pine tar | 2 | 2 | 2 | 2 | 2 |
| Stearic acid | 3 | 3 | 3 | 3 | 3 |
| Sulfur | 3 | 3 | 3 | 3 | 3 |
| Mercaptobenzothiazole | 0.75 | 0.75 | 0.75 | 0.75 | 0.75 |
| p-Amino biphenyl-acetone condensation product | 1.0 | 0.5 | 0.5 | 0.5 |  |
| Phenol-bis N,N'-(2-benzothiazyl thio methyl) urea brown resinous reaction product of Example 1 |  | 0.5 |  |  |  |
| Hydroquinone-bis N,N'-(2-benzo thiazyl thio methyl) urea brittle black resinous reaction product of Example 2 |  |  | 0.5 |  |  |
| Resorcinol-bis N,N'-(2-benzo thiazyl thio methyl) urea red resinous reaction product of Example 3 |  |  |  | 0.5 |  |

The above rubber stocks so compounded were then vulcanized by heating in a press for 60 minutes and 90 minutes respectively at 135° C. Test strips were cut from the vulcanized stocks and artificially aged in an air bomb for 6 and 9 hours, respectively, at 121° C. and under a pressure of 80 pounds per square inch. The physical test data of the respective stocks is set forth below.

Table I

| Stock | Min. cure at 135° C. | Unaged Modulus (lbs./in.²) at elongations of— | | Ult. Elong., percent | Ultimate Tensile, lbs./in.² | Tensile strength after aging in Air Bomb at 121° C. (lbs./in.²) | |
|---|---|---|---|---|---|---|---|
|  |  | 300% | 500% |  |  | 6 hours | 9 hours |
| A | 60 | 1,593 | 3,270 | 603 | 4,620 | 2,730 | 1,523 |
| B | 60 | 1,733 | 3,750 | 580 | 4,467 | 3,023 | 2,080 |
| C | 60 | 1,813 | 3,793 | 587 | 4,623 | 3,085 | 2,223 |
| D | 60 | 1,807 | 3,727 | 590 | 4,477 | 3,155 | 2,143 |
| E | 60 | 1,607 | 3,667 | 600 | 4,560 | 1,040 | 693 |
| A | 90 | 1,947 | 4,017 | 627 | 4,723 | 2,573 | 1,593 |
| B | 90 | 1,970 | 4,133 | 573 | 4,577 | 2,817 | 2,027 |
| C | 90 | 2,017 | 4,137 | 550 | 4,570 | 2,947 | 1,903 |
| D | 90 | 1,960 | 4,160 | 543 | 4,307 | 2,957 | 2,193 |
| E | 90 | 1,943 | 4,017 | 550 | 4,430 | 960 | 620 |

It is obvious from the above data that an aliphatic ketone-aromatic amine condensation product's age resistant properties are appreciably intensified by substituting a portion of said condensation product with the reaction product of a hydroxy aromatic hydrocarbon and an N-(2-thiazyl thio methyl) urea. Compositions B, C and D were markedly superior in flex-cracking resistance to stock A as evident from Table II below. Test pieces were cut from the above described vulcanized rubber stocks and artificially aged for 9 hours at 121° C. in an air bomb under 80 lbs./in.² pressure. The flex-cracking resistance of these aged specimens was then determined by a flexing machine as set forth by L. V. Cooper, Analytical Edition of Industrial and Engineering Chemistry, vol. 2, No. 4, pp. 391–394. The flexing data are as follows:

Table II

| Stock | A | B | C | D | E |
|---|---|---|---|---|---|
|  | Kilocycles to failure | Kilocycles to failure | Kilocycles to failure | Kilocycles to failure | Kilocycles to failure |
| Aged 9 hours at 121° C. in an Air Bomb at 80 p. s. i | 149 | 177 | 163 | 177 | 6 |

These improved antioxidant compositions are readily dispersible in vulcanized as well as unvulcanized rubber, both natural and synthetic, and present no compounding problem.

Other ketone-amine condensation products which possess antioxidant properties such as aniline-acetone, toluidine-acetone, napthylamine-acetone, anisidine-acetone, phenetidine-acetone, diphenylamine-acetone, dinaphthylamine-acetone, phenyl naphthylamine-acetone, and the like, or mixtures thereof, when employed in conjunction with the reaction product of a hydroxy aromatic hydrocarbon and an N-(2-thiazyl thio methyl) urea produce antioxidant compositions characterized by a pronounced synergistic effect and ready dispersibility in natural and synthetic rubber.

As further exemplary of the invention the following embodiment is illustrative and in nowise is to be considered limitative thereof.

EXAMPLE 4

The crude brown sticky resinous product of Example 1 was taken up with chloroform and allowed to stand for about 16 hours. The solution was filtered and the filtrate extracted with a dilute solution of ammonium hydroxide. Thereupon the filtrate was placed on a steam bath and the chloroform evaporated. Approximately 70% of the original sticky resinous product was recovered as a soft brown resinous material.

The above described brown resinous material was mechanically mixed with the p-amino biphenyl-acetone condensation product, described by J. R. Ingram, U. S. Patent 2,062,885, in various proportions and the mixtures incorporated in the usual manner in a hevea rubber stock suitable for the carcass of an automobile tire, comprising new antioxidant composition containing the above described aliphatic ketone-aromatic amine condensation product and the above described solvent treated phenol-bis N,N'-(benzothiazyl thio methyl) urea reaction product readily dispersed in the unvulcanized stock.

These novel resinous compositions which appreciably improve the antioxidant and flex-re-

| Stocks | F | G | H | I | K |
|---|---|---|---|---|---|
| | Parts by weight | Parts by weight | Parts by weight | Parts by weight | Parts by weight |
| Smoked sheets rubber | 100. | 100. | 100. | 100. | 100. |
| Zinc oxide | 30. | 30. | 30. | 30. | 30. |
| Coal tar oil | 3. | 3. | 3. | 3. | 3. |
| Sulfur | 2.5 | 2.5 | 2.5 | 2.5 | 2.5 |
| Stearic acid | 1.5 | 1.5 | 1.5 | 1.5 | 1.5 |
| Diphenyl guanidine phthalate | 0.4 | 0.4 | 0.4 | 0.4 | 0.4 |
| Benzothiazyl thio benzoate | 0.3 | 0.3 | 0.3 | 0.3 | 0.3 |
| Amino biphenyl-acetone condensation product | 1.0 | 0.75 | 0.5 | | |
| Phenol-bis N,N'-(2-benzothiazyl thio methyl) urea soft brown resinous reaction product of Example 4 | | 0.25 | 0.5 | 1.0 | |

The respective stocks so compounded were then vulcanized by heating in a press for various periods of time at 126° C. Test strips were cut from the vulcanized stock and artificially aged for 9 hours in an air bomb at 121° C. under 80 pounds per square inch pressure. Test data of the respective stocks are set forth below:

sistant properties of aliphatic ketone-aromatic amine condensation products may be further reacted and the resultant products when employed in conjunction with an aliphatic ketone-aromatic amine condensation product still exhibit synergism. As exemplary of this particular embodiment, the following is illustrative.

*Table III*

| Stock | Mins. cure at 126° C. | Modulus (lbs./in.²) at Elongations of— | | Ultimate Tensile, lbs./in.² | Ultimate Elongation, percent |
|---|---|---|---|---|---|
| | | 300% | 500% | | |
| F | 45 | Unaged, 285 | Unaged, 1,158 | 3,952 | 710 |
| F | 45 | Aged, 212 | Aged, 912 | 1,635 | 615 |
| G | 45 | Unaged, 350 | Unaged, 1,237 | 3,980 | 700 |
| G | 45 | Aged, 342 | Aged, 1,250 | 2,090 | 597 |
| H | 45 | Unaged, 385 | Unaged, 1,340 | 4,118 | 715 |
| H | 45 | Aged, 367 | Aged, 1,463 | 2,078 | 572 |
| I | 45 | Unaged, 362 | Unaged, 1,376 | 4,178 | 700 |
| I | 45 | Aged | Aged | 163 | 287 |
| K | 45 | Unaged, 308 | Unaged, 1,228 | 3,877 | 713 |
| K | 45 | Aged, 188 | Aged, 723 | 910 | 540 |
| F | 60 | Unaged, 397 | Unaged, 1,410 | 3,650 | 662 |
| F | 60 | Aged, 253 | Aged, 938 | 1,168 | 572 |
| G | 60 | Unaged, 413 | Unaged, 1,455 | 3,957 | 662 |
| G | 60 | Aged, 328 | Aged, 1,163 | 1,645 | 582 |
| H | 60 | Unaged, 435 | Unaged, 1,517 | 3,725 | 658 |
| H | 60 | Aged, 383 | Aged, 1,365 | 1,908 | 578 |
| I | 60 | Unaged, 413 | Unaged, 1,363 | 3,632 | 668 |
| I | 60 | Aged, 188 | Aged | 188 | 300 |
| K | 60 | Unaged, 415 | Unaged, 1,492 | 3,755 | 660 |
| K | 60 | Aged, 160 | Aged | 180 | 315 |
| F | 90 | Unaged, 407 | Unaged, 1,477 | 3,682 | 658 |
| F | 90 | Aged, 227 | Aged, 1,008 | 1,230 | 542 |
| G | 90 | Unaged, 385 | Unaged, 1,472 | 3,585 | 650 |
| G | 90 | Aged, 307 | Aged, 1,163 | 1,530 | 555 |
| H | 90 | Unaged, 418 | Unaged, 1,530 | 3,858 | 658 |
| H | 90 | Aged, 363 | Aged, 1,383 | 1,815 | 572 |
| I | 90 | Unaged, 365 | Unaged, 1,257 | 3,317 | 652 |
| I | 90 | Aged, 205 | Aged | 215 | 303 |
| K | 90 | Unaged, 425 | Unaged, 1,562 | 3,957 | 662 |
| K | 90 | Aged, 185 | Aged | 463 | 425 |

Observing the tensile strengths and moduli of stocks G and H as compared to stock F in the above table, it is obvious that mixtures of an aromatic amine-aliphatic ketone condensation product and the product of the reaction of a hydroxy aromatic hydrocarbon with an N-(2-thiazyl thio methyl) urea are markedly superior in age resistance properties to an equal weight of an aromatic amine-aliphatic ketone condensation product (stock F). It should also be observed that stock I containing one part by weight of the phenol-N-(2-thiazyl thio methyl) urea reaction product and no amine-ketone condensation product possesses poorer aging properties than the control stock (stock K). This

EXAMPLE 5

37 parts by weight of the sticky brown resinous product of Example 1 was placed in a suitable reaction vessel containing 41 parts by weight (substantially 0.5 mol) of a 37% solution of formaldehyde and 1 part by weight of hexamethylene tetramine. The reaction flask was placed on a steam bath and heated for 24 hours with agitation. Upon cooling, 47.6 parts by weight of a hard brittle resin was obtained.

The above described brittle resinous material was mechanically mixed respectively with the p-amino biphenyl-acetone acetone condensation product, described by J. R. Ingram, U. S. Patent 2,062,885, and with the diphenylamine-acetone condensation product, described by W. P. ter Horst, U. S. Patent 1,807,355, and the mixtures incorporated in the usual manner in a hevea rubber stock suitable for the tread portion of an automobile tire comprising.

|  | L | M | N | O | P | R | S |
|---|---|---|---|---|---|---|---|
|  | Parts by weight | Parts by weight | Parts by weight | Parts by weight | Parts by weight | Parts by weight | Parts by weight |
| Smoked sheets rubber | 100. | 100. | 100. | 100. | 100. | 100. | 100. |
| Carbon black | 50. | 50. | 50. | 50. | 50. | 50. | 50. |
| Zinc oxide | 5. | 5. | 5. | 5. | 5. | 5. | 5. |
| Pine tar | 2. | 2. | 2. | 2. | 2. | 2. | 2. |
| Sulfur | 3. | 3. | 3. | 3. | 3. | 3. | 3. |
| Stearic acid | 3. | 3. | 3. | 3. | 3. | 3. | 3. |
| Mercaptobenzothiazole | 0.75 | 0.75 | 0.75 | 0.75 | 0.75 | 0.75 | 0.75 |
| p-Amino biphenyl-acetone reaction product |  | 0.5 | 1.0 | 0.5 |  |  |  |
| Diphenylamine-acetone reaction product |  |  |  |  | 0.5 | 1.0 | 0.5 |
| The brittle resinous material of Example 5 |  |  |  | 0.5 |  |  | 0.5 |

The respective stocks so compounded were then vulcanized by heating in a press for 60 minutes at 135° C. Test strips were cut from the vulcanized stocks and artificially aged for 9 hours in an air bomb at 121° C. Test data of the respective stocks are set forth below:

Table IV

| Stock | Min. Cure at 135° C. | Modulus in lbs./in.² at Elongations of— | | Tensile in lbs./in.² | Ultimate Elongation, percent | Tensile (lbs./in.²) after 9 hrs. aging |
|---|---|---|---|---|---|---|
|  |  | 300% | 500% |  |  |  |
| L | 60 | 1,607 | 3,667 | 4,560 | 600 | 693 |
| M | 60 | 1,488 | 3,512 | 4,550 | 620 | 1,310 |
| N | 60 | 1,593 | 3,270 | 4,620 | 603 | 1,523 |
| O | 60 | 1,562 | 3,610 | 4,762 | 643 | 1,561 |
| P | 60 | 1,480 | 3,374 | 4,584 | 640 | 1,602 |
| R | 60 | 1,472 | 3,602 | 4,666 | 620 | 1,602 |
| S | 60 | 1,648 | 3,620 | 4,790 | 620 | 2,034 |

From the above data it is readily concluded that an aliphatic ketone-aromatic amine condensation product's antioxidant properties are appreciably increased by merely blending with a modified hydroxy aromatic hydrocarbon-N-(2-thiazyl thio methyl) urea reaction product.

Hydroxy aromatic hydrocarbons, other than the above described, which when reacted with an N-(2-thiazyl thio methyl) urea will produce readily dispersible compositions which improve the antioxidant properties of aliphatic ketone-aromatic amine condensation products are catechol, the naphthols, p-tertiary butyl phenol, thymol, carvacrol, the cresols, the xylenols, guaiacol, pyrogallol, and the like.

Among the N-(2-thiazyl thio methyl) ureas other than bis N,N'-(2-benzothiazyl thio methyl) urea which are satisfactory are N-(2-thiazolinyl thio methyl) urea and thiourea, N-(4,5-dimethyl, 2-thiazyl thio methyl) urea and thiourea, N-(4-ethyl, 2-thiazyl thio methyl) urea and thiourea, and the reaction products of mercapto arylene thiazoles with methylol carbamides and methylol thiocarbamides as described and disclosed by R. L. Sibley, U. S. Patent 2,145,808.

The components of the new antioxidant composition, namely the ketone-amine condensation product and the hydroxy aromatic hydrocarbon-N-(2-thiazyl thio methyl) urea reaction product, may be added separately but are preferably intimately mixed by fusion or mechanical blending before they are incorporated in the rubber.

The components of the new antioxidant composition may be employed in ratios and amounts other than those described above in the specific examples. Particularly good results are obtained when substantially equal amounts of aliphatic ketone-aromatic condensation product and hydroxy aromatic hydrocarbon-N-(2-thiazyl thio methyl) urea reaction product are employed.

By the term "rubber" as employed in the specification and appended claims, unless otherwise modified, is intended to be used in its generic sense to include rubber substitutes, natural rubber, synthetic rubber, and the like, whether or not admixed with fillers, pigments, accelerators, etc.

By the term "treating" as employed in the appended claims is intended to be used in its generic sense to embrace the incorporation of the antioxidant into a rubber or rubber-like substance by milling or mastication, its addition to rubber latices, and any equivalent procedure such as applying it to the surface of a vulcanized or unvulcanized rubber in the form of a powder or paste.

While certain specific embodiments of this invention have been disclosed herein, it is to be understood that the invention is not limited for many modifications including substitution of materials having equivalent chemical properties and varying the proportion of materials used such as the amount and type of vulcanization accelerator may be done without departing from the spirit or scope of the invention.

What is claimed is:

1. The method of preserving a rubber which comprises treating a rubber with both an antioxidant which is the condensation product of an aliphatic ketone and an aromatic amine and with a synergist for the antioxidant which is the condensation product of a member of the group consisting of alpha-naphthol, beta-naphthol, and an hydroxy substituted benzene containing at least one but not more than three hydroxy groups and at least three hydrogen atoms linked to nuclear carbon atoms, the radicals linked to the remaining carbon atoms of the nucleus being selected from the group consisting of hydrogen, alkyl radicals containing not more than four carbon atoms and methoxy radicals, and a compound of the general formula

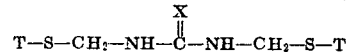

where T is an arylene thiazyl radical and X is an element of group VI of the periodic table having an atomic weight less than 33, the ratio of antioxidant to synergist being within the range of one to three parts antioxidant to one part synergist by weight.

2. The method of preserving a rubber which comprises treating a rubber with both an antioxidant which is the condensation product of an aliphatic ketone and an aromatic amine and with a synergist for the antioxidant which is the condensation product of a benzene hydrocarbon containing not more than ten carbon atoms having at least three unsubstituted nuclear positions and containing at least one but not more than three of the nuclear hydrogen atoms substituted by hydroxy groups and a compound of the general formula

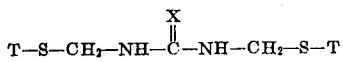

where T is an arylene thiazyl radical and X is an element of group VI of the periodic table having an atomic weight less than 33, the ratio of antioxidant to synergist being within the range of one to three parts antioxidant to one part synergist by weight.

3. The method of preserving a rubber which comprises treating a rubber with both an antioxidant which is the condensation product of an aliphatic ketone and an aromatic amine and with a synergist for the antioxidant which is the condensation product of a monohydric phenol containing not more than ten carbon atoms in which the hydroxyl group is linked to a hydrocarbon group consisting in a benzene ring containing at least three unsubstituted positions and a bis N,N'-(2-arylenethiazylthiomethyl) urea, the ratio of antioxidant to synergist being within the range of one to three parts antioxidant to one part synergist by weight.

4. The method of preserving a rubber which comprises treating a rubber with a composition comprising a rubber antioxidant which is the condensation product of an aliphatic ketone with an aromatic amine and a synergist for the antioxidant which is the reaction product of resorcinol with bis N,N'-(2-benzothiazyl thio methyl) urea the ratio of antioxidant to synergist being within the range of one to three parts antioxidant to one part synergist by weight.

5. The method of preserving a rubber which comprises treating a rubber with a composition comprising a rubber antioxidant which is the condensation product of an aliphatic ketone with an aromatic amine and a synergist for the antioxidant which is the reaction product of hydroquinone with bis N,N'-(2-benzothiazyl thio methyl) urea the ratio of antioxidant to synergist being within the range of one to three parts antioxidant to one part synergist by weight.

6. The method of preserving a rubber which comprises treating a rubber with a composition comprising a rubber antioxidant which is the condensation product of an aliphatic ketone with an aromatic amine and a synergist for the antioxidant which is the reaction product of phenol with bis N,N'-(2-benzothiazyl thio methyl) urea the ratio of antioxidant to synergist being within the range of one to three parts antioxidant to one part synergist by weight.

7. The method of preserving a rubber which comprises treating a rubber with a composition comprising a rubber antioxidant which is the condensation product of acetone with p-amino biphenyl and a synergist for the antioxidant which is the reaction product of bis N,N'-(2-benzothiazyl thio methyl) urea with resorcinol the ratio of antioxidant to synergist being within the range of one to three parts antioxidant to one part synergist by weight.

8. The method of preserving a rubber which comprises treating a rubber with a composition comprising a rubber antioxidant which is the condensation product of acetone with p-amino biphenyl and a synergist for the antioxidant which is the reaction product of bis N,N'-(2-benzothiazyl thio methyl) urea with hydroquinone the ratio of antioxidant to synergist being within the range of one to three parts antioxidant to one part synergist by weight.

9. The method of preserving a rubber which comprises treating a rubber with a composition comprising a rubber antioxidant which is the condensation product of acetone with p-amino biphenyl and a synergist for the antioxidant which is the reaction product of bis N,N'-(2-benzothiazyl thio methyl) urea with phenol the ratio of antioxidant to synergist being within the range of one to three parts antioxidant to one part synergist by weight.

10. The vulcanized rubber product obtained by treating a rubber with both an antioxidant which is the condensation product of an aliphatic ketone and an aromatic amine and with a synergist for the antioxidant which is the condensation product of a member of the group consisting of alpha-naphthol, beta-naphthol, and an hydroxy substituted benzene containing at least one but not more than three hydroxy groups and at least three hydrogen atoms linked to nuclear carbon atoms, the radicals linked to the remaining carbon atoms of the nucleus being selected from the group consisting of hydrogen, alkyl radicals containing not more than four carbon atoms and methoxy radicals, and a compound of the general formula

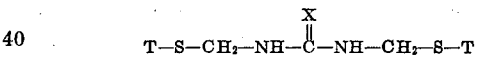

where T is an arylene thiazyl radical and X is an element of group VI of the periodic table having an atomic weight less than 33, the ratio of antioxidant to synergist being within the range of one to three parts antioxidant to one part synergist by weight.

11. The vulcanized rubber product obtained by treating a rubber with both an antioxidant which is the condensation product of an aliphatic ketone and an aromatic amine and with a synergist for the antioxidant which is the condensation product of a benzene hydrocarbon containing not more than ten carbon atoms having at least three unsubstituted nuclear positions and containing at least one but not more than three of the nuclear hydrogen atoms substituted by hydroxy groups and a compound of the general formula

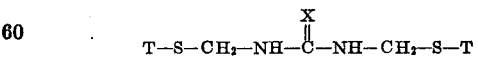

where T is an arylene thiazyl radical and X is an element of group VI of the periodic table having an atomic weight less than 33, the ratio of antioxidant to synergist being within the range of one to three parts antioxidant to one part synergist by weight.

12. The vulcanized rubber product obtained by treating a rubber with both an antioxidant which is the condensation product of an aliphatic ketone and an aromatic amine and with a synergist for the antioxidant which is the condensation product of a monohydric phenol containing not more than ten carbon atoms in which the hydroxyl group is linked to a hydrocarbon group consisting in a benzene ring containing at least three unsubstituted positions and a bis N,N'-(2-arylenethiazylthiomethyl) urea, the ratio of antioxidant to synergist being within the range of one to three parts antioxidant to one part synergist by weight.

13. The vulcanized rubber product obtained by treating a rubber with a composition comprising a rubber antioxidant which is the condensation product of an aliphatic ketone with an aromatic amine and a synergist for the antioxidant which is the reaction product of resorcinol with bis N,N'-(2-benzothiazyl thio methyl) urea the ratio of antioxidant to synergist being within the range of one to three parts antioxidant to one part synergist by weight.

14. The vulcanized rubber product obtained by treating a rubber with a composition comprising a rubber antioxidant which is the condensation product of an aliphatic ketone with an aromatic amine and a synergist for the antioxidant which is the reaction product of hydroquinone with bis N,N'-(2-benzothiazyl thio methyl) urea the ratio of antioxidant to synergist being within the range of one to three parts antioxidant to one part synergist by weight.

15. The vulcanized rubber product obtained by treating a rubber with a composition comprising a rubber antioxidant which is the condensation product of an aliphatic ketone with an aromatic amine and a synergist for the antioxidant which is the reaction product of phenol with bis N,N'-(2-benzothiazyl thio methyl) urea the ratio of antioxidant to synergist being within the range of one to three parts antioxidant to one part synergist by weight.

16. The vulcanized rubber product obtained by treating a rubber with a composition comprising a rubber antioxidant which is the condensation product of acetone with p-amino biphenyl and a synergist for the antioxidant which is the reaction product of bis N,N'-(2-benzothiazyl thio methyl) urea with resorcinol the ratio of antioxidant to synergist being within the range of one to three parts antioxidant to one part synergist by weight.

17. The vulcanized rubber product obtained by treating a rubber with a composition comprising a rubber antioxidant which is the condensation product of acetone with p-amino biphenyl and a synergist for the antioxidant which is the reaction product of bis N,N'-(2-benzothiazyl thio methyl) urea with hydroquinone the ratio of antioxidant to synergist being within the range of one to three parts antioxidant to one part synergist by weight.

18. The vulcanized rubber product obtained by treating a rubber with a composition comprising a rubber antioxidant which is the condensation product of acetone with p-amino biphenyl and a synergist for the antioxidant which is the reaction product of bis N,N'-(2-benzothiazyl thio methyl) urea with phenol the ratio of antioxidant to synergist being within the range of one to three parts antioxidant to one part synergist by weight.

MARION W. HARMAN.

REFERENCES CITED

The following references are of record in the file of this patent:

UNITED STATES PATENTS

| Number | Name | Date |
|---|---|---|
| 1,782,842 | Cronshaw et al. | Nov. 25, 1930 |
| 1,805,194 | Strickhouser | May 12, 1931 |
| 2,062,885 | Ingram | Dec. 1, 1936 |
| 2,145,808 | Sibley | Jan. 31, 1939 |